Feb. 25, 1947. J. C. NEELEY 2,416,492
TANDEM CARRIER
Filed Jan. 3, 1945
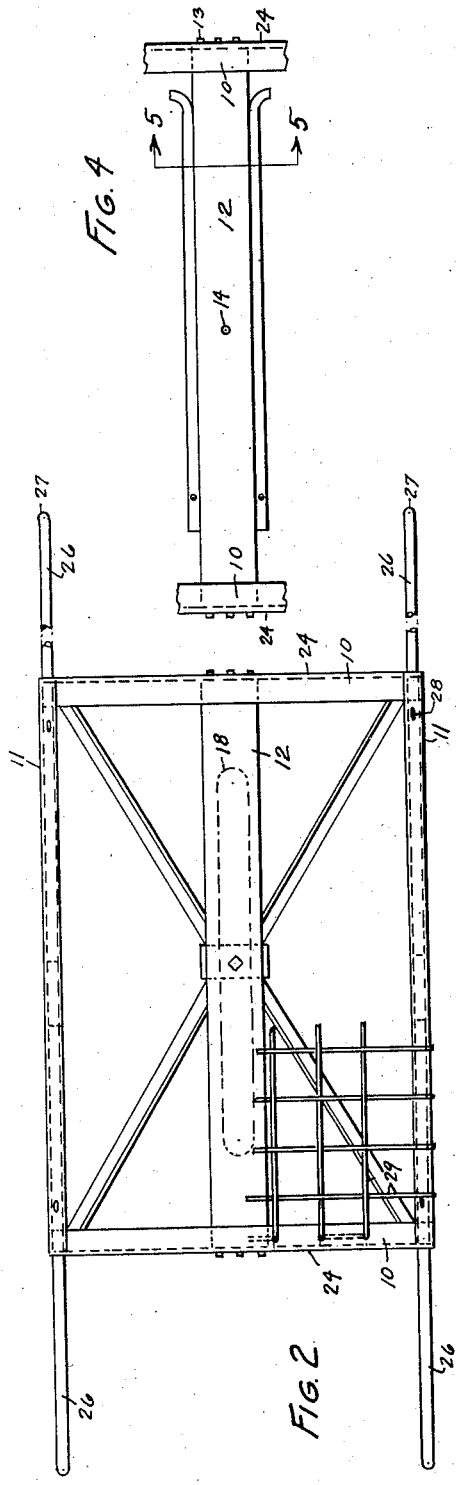
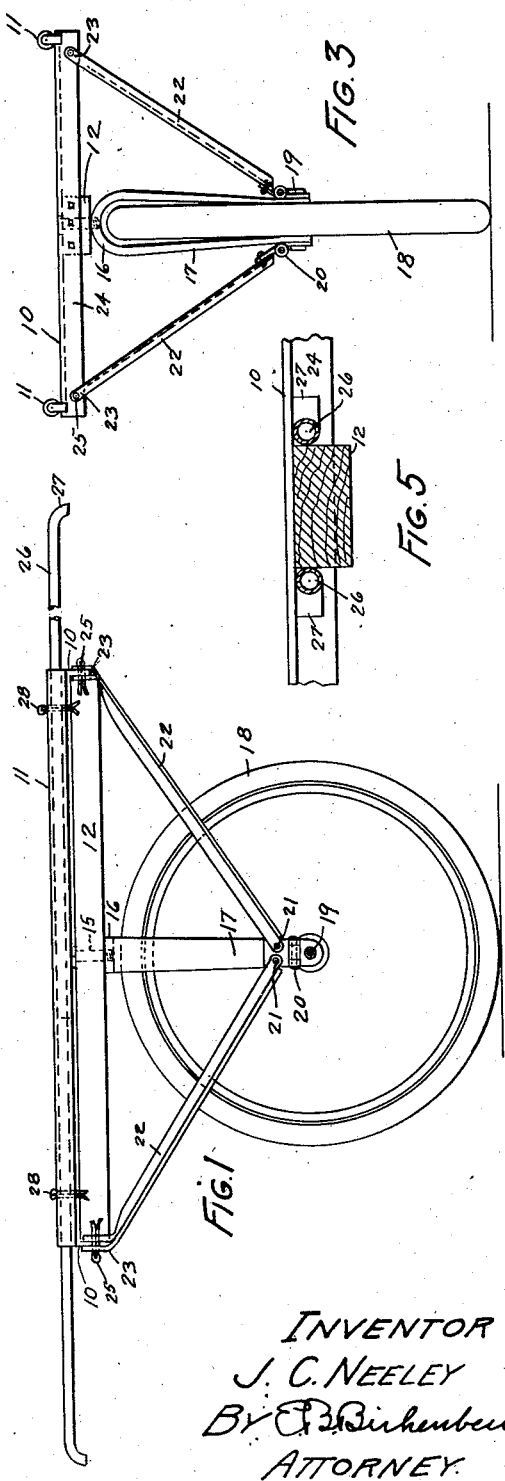
INVENTOR
J. C. NEELEY
BY Birkenbeuel
ATTORNEY.

Patented Feb. 25, 1947

2,416,492

UNITED STATES PATENT OFFICE 2,416,492

TANDEM CARRIER

James C. Neeley, Portland, Oreg.

Application January 3, 1945, Serial No. 571,143

2 Claims. (Cl. 280—58)

This invention relates generally to land traveling vehicles and particularly to a tandem carrier.

The main object of this invention is to provide a vehicle especially adapted for use by hunters and fishermen for transporting packs over exceedingly rough terrain, in which the weight is carried by the vehicle and the balancing and propelling power alone is provided by two operators.

The second object is to construct a vehicle of the class described which would be exceedingly light in relation to the load which may be carried, and also that the vehicle may be easily collapsed for storage on pack animals or in automobiles or other conveyances.

I accomplish these and other objects in a manner set forth in the following specification as illustrated in the accompanying drawing, in which Fig. 1 is a side elevation of the device.

Fig. 2 is a plan of Fig. 1.

Fig. 3 is an end elevation of Fig. 1.

Fig. 4 is a fragmentary view of the center bar showing a pair of handles stored adjacent thereto.

Fig. 5 is a transverse section taken along the line 5—5 in Fig. 4.

Similar numerals refer to similar parts throughout the several views.

Referring in detail to the drawing, there is shown a rectangular frame consisting of the end angle bars 10, which are joined by the longitudinal tubes 11. A similar bar 12 extends longitudinally across the members 10 and is secured thereto by means of the bolts 13. In the center of the bar 12 is formed a hole 14 for a bolt 15, which is threaded into the upper end 16 of a fork 17 in which is mounted a pneumatic wheel 18 on the axle 19. Attached to the axle 19 are the hinged members 20 to which are pivotally attached by means of the rivets 21 the angle bar braces 22, whose outermost ends are slotted and bent to form the parallel fingers 23, which straddle the downturned side 24 of the angle bar 10. A cotter pin 25 passes through the fingers 23 and side 24. The purpose of this construction is to permit the easy disassembling of the device for packing or storing purposes.

Extending into the tubular sides 11 are the tubular handle bars 26, whose ends 27 are preferably downturned as illustrated. Each bar 27 is perforated to receive a cotter pin 28, for which holes are provided in the tubular member 11. It is desirable to so space the holes for the pins 28 that when the device is collapsed and two of handle bars 26 are pushed into the tubes 11 as far as possible, the pins 28 may be inserted into the farther holes and serve to retain the bars 26 in position.

It is desirable to provide a lattice of webbing 29, preferably woven as illustrated. Thongs, wire or cords may be employed for this purpose. In Fig. 4 the webbing 29 is removed and two of the handle bars 27 are shown as stored alongside of the center bar 12, it being understood that the other two handle bars are stored with the tubes 11 and held there by means of the pins 28. When stored alongside of the bar 12 they may be tied or otherwise secured, as appears most convenient, no special form of attachment having been illustrated.

It can be seen from the foregoing that by means of this device, two men can carry a sizable load over rough terrain with a minimum amount of effort, their principal problem being to balance and propel the load rather than to sustain it, and since there is only one wheel, it can be easily maneuvered and can be used on the narrowest of trails. As stated, if it is desired to collapse the device, it is only necessary to withdraw the pins 25 and remove the bolt 15, which permits the braces 22 to fold alongside of the fork 17 and the entire wheel 18 and the fork 17 can be detached from the bar 12 for the purpose indicated.

While I have thus illustrated and described my invention, it is not my desire to be limited to the precise form shown herein, and I intend to cover such forms and modifications of the invention as fall fairly within the appended claims.

I claim:

1. In a vehicle of the class described, a rectangular frame comprising tubular members having handles telescopically mounted at the corners thereof, a center bar disposed along the center of said frame secured to the ends thereof, a forked member and braces therefore attached to the under sides of said frame and to the under side of said center bar, a wheel mounted in said fork, and removable braces for holding said forks in operative positions normal to said frame.

2. A vehicle of the class described consisting of a rectangular frame comprising tubular side members fixedly joined at the ends thereof in a manner to provide access to the interior of the side members, rod members extending into said side members and slidable therein, constituting handles when extended, a forked member disposed under said frame near the middle thereof, a wheel mounted in said fork, an axle passing through said wheel and means for holding said fork in rigid relation to said side frames.

JAMES C. NEELEY.

REFERENCES CITED

The following references are of record in the file of this patent:

UNITED STATES PATENTS

| Number | Name | Date |
|---|---|---|
| 1,470,151 | Dennen | Oct. 9, 1923 |

FOREIGN PATENTS

| Number | Country | Date |
|---|---|---|
| 11,619 | French | |
| 13,236 | French | Dec. 12, 1910 |
| 4,968 | British | 1913 |
| 391,495 | French | Aug. 31, 1908 |